US012758892B2

(12) United States Patent
Segan

(10) Patent No.: US 12,758,892 B2
(45) Date of Patent: Oct. 13, 2026

(54) FORTUNE FLOWER

(71) Applicant: Marc Howard Segan, New York, NY (US)

(72) Inventor: Marc Howard Segan, New York, NY (US)

( * ) Notice: Subject to any disclaimer, the term of this patent is extended or adjusted under 35 U.S.C. 154(b) by 0 days.

(21) Appl. No.: 19/391,176

(22) Filed: Nov. 17, 2025

(65) Prior Publication Data

US 2026/0138046 A1 May 21, 2026

Related U.S. Application Data

(60) Provisional application No. 63/721,617, filed on Nov. 18, 2024.

(51) Int. Cl.

*A63H 33/22* (2006.01)
*F21V 11/00* (2015.01)
*F21V 14/08* (2006.01)

(52) U.S. Cl.

CPC .............. *A63H 33/22* (2013.01); *F21V 11/00* (2013.01); *F21V 14/08* (2013.01)

(58) Field of Classification Search

CPC ..... A63H 33/22; F21V 11/00; F21V 11/0011; F21V 11/0016; F21V 11/0018; F21V 14/08

USPC .... 362/35, 319, 322–324; 40/292, 431–433; 273/161

See application file for complete search history.

(56) References Cited

U.S. PATENT DOCUMENTS

| | | | | |
|---|---|---|---|---|
| 432,813 | A * | 7/1890 | Ballantine | |
| 3,640,011 | A * | 2/1972 | Fukumitsu | G09F 19/125 40/433 |
| 4,631,848 | A * | 12/1986 | Iwasa | A63H 33/22 40/587 |
| 5,406,729 | A * | 4/1995 | Bejin | G09F 13/04 40/433 |
| 6,351,903 | B1 * | 3/2002 | Tuomi | A44B 15/005 206/38.1 |
| 6,513,951 | B1 * | 2/2003 | Wang | B44C 5/005 362/253 |

* cited by examiner

*Primary Examiner* — Thomas M Sember

(74) *Attorney, Agent, or Firm* — Tutunjian & Bitetto, P.C.

(57) ABSTRACT

A device includes a body and a disc, rotatably attached to the body, that includes characters arranged around the disc. A light source is attached to the body and illuminates selected characters. Control circuitry triggers the light source to illuminate the selected characters to display a message as the disc rotates.

19 Claims, 5 Drawing Sheets

FORTUNE FLOWER

BACKGROUND

Technical Field

Described herein are embodiments related to a toy and, more particularly, to a fortune telling toy.

Description of the Related Art

Fortune-telling toys have long held a place in playrooms and schoolyards. Classic examples include the Magic 8 Ball®, where the user asks a question and then reveals an answer through a floating die with phrases like "Yes," "No," or "Ask again later." School children make paper fortune tellers-often folded from notebook paper and decorated with colors, numbers, and predictions. In each case, the toy produces an unpredictable outcome to serve as an answer to the user's question.

SUMMARY

A device includes a body and a disc, rotatably attached to the body, that includes characters arranged around the disc. A light source is attached to the body and illuminates selected characters. Control circuitry triggers the light source to illuminate the selected characters to display a message as the disc rotates.

A device includes a body and a disc, rotatably attached to the body, that includes characters arranged around the disc. Light emitting diodes (LEDs), attached to the body, illuminate selected characters. A position sensor determines an angular position of the disc. Control circuitry triggers individual LEDs according to the determined angular position of the disc and a position of a corresponding character within the message to illuminate the selected characters to display a message as the disc rotates.

A device includes a body and a translucent disc, rotatably attached to the body, that includes opaque characters arranged around the disc. A handle is rotatably attached to the body and is connected to the disc to cause the disc to rotate. LEDs are attached to the body to illuminate selected characters. A photosensor determines an angular position of the disc by detecting a mark on the disc. Control circuitry triggers individual LEDs according to the determined angular position of the disc and a position of a corresponding character within the message to illuminate the selected characters to display a message as the disc rotates.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

A fortune telling toy may include an electronic system with a wheel of letters and numbers. A crank controls rotation of the wheel as well as provides input to control circuitry. The control circuitry turns on light sources underneath the spinning wheel at predetermined times, thereby illuminating the letters in predetermined positions to spell out an answer. As a given character revolves past the light sources, it may be illuminated repeatedly in the same position to give the visual impression of a character fixed in space. With multiple light sources next to one another, multiple letters may be illuminated to produce entire words. The control circuitry thereby displays answers from a predetermined list, presented as an answer to a user's hypothetical question. Although the present embodiments are described with a focus on fortune telling, where the displayed answers are phrased to respond to user questions, any appropriate message or sentiment may be displayed.

Figure 1:
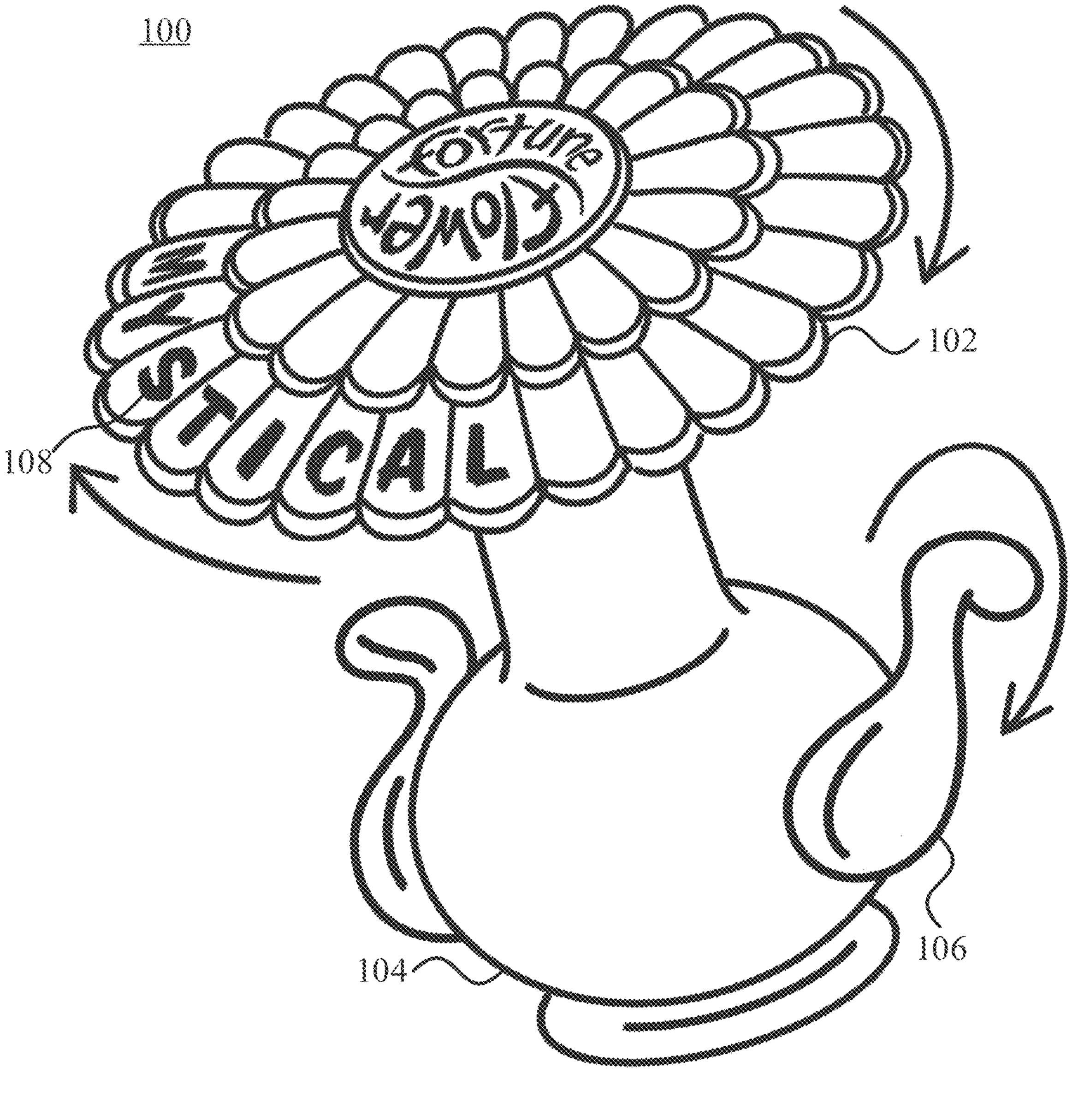
FIG. 1 is a view of a toy that has a rotatable disc, illuminating characters on the disc to show a predetermined message, in accordance with an embodiment of the present invention.

Referring now to FIG. 1, a fortune telling toy 100 is shown. The toy 100 includes a disc 102 that is rotatably mounted to a body 104. A handle 106 is rotatably mounted to the body 104 and is connected within the body 104 to the disc 102, such that rotating the handle 106 causes the disc 102 to rotate as well. The handle 106 may be implemented as a crank which can be operated by hand, turning the disc 102 via a gear and shaft. In some embodiments, the rotation of the disc 102 may be controlled by a motor and power source within the body 104. In embodiments where the disc 102 is controlled by a motor, the rotation of the disc 102 may be triggered by a button (not shown).

The disc 102 includes alphanumeric characters 108 around its perimeter. The disc 102 may be partially translucent, with characters 108, such that light sources underneath the disc 102, mounted to the body 104, shine light either through or around the characters 108 to illuminate them. In some embodiments the body of the disc 102 may be translucent and the characters 108 may be opaque, while in other embodiments the body of the disc 102 may be opaque and the characters 108 may be translucent. During operation, control circuitry detects the rotation of the disc 102 and sends power to the light sources such that characters 108 are illuminated at predetermined times, causing the visual impression of an illuminated word. In some embodiments the power to the light source may be provided by batteries. In other embodiments, the power to the light source may be generated by a dynamo powered by the rotation of the handle 106.

Although the light source only illuminates the characters 108 at discrete points in time, the phenomenon of persistence of vision gives the impression that the letter is illuminated for a longer period, giving the disc 102 time to complete a rotation so that the character 108 can be illuminated again. As long as the disc 102 rotates quickly enough, the visual impression is that the character 108 appears to be continuously illuminated.

Two-dimensional embodiments are also envisioned. A two-dimensional embodiment may replace the handle with a flat, finger-operated crank next to the spinning disc 102, in a flat format that resembles a greeting card. In such an embodiment, the body 104 may be formed around the disc 102 to house the light source.

Figure 2:
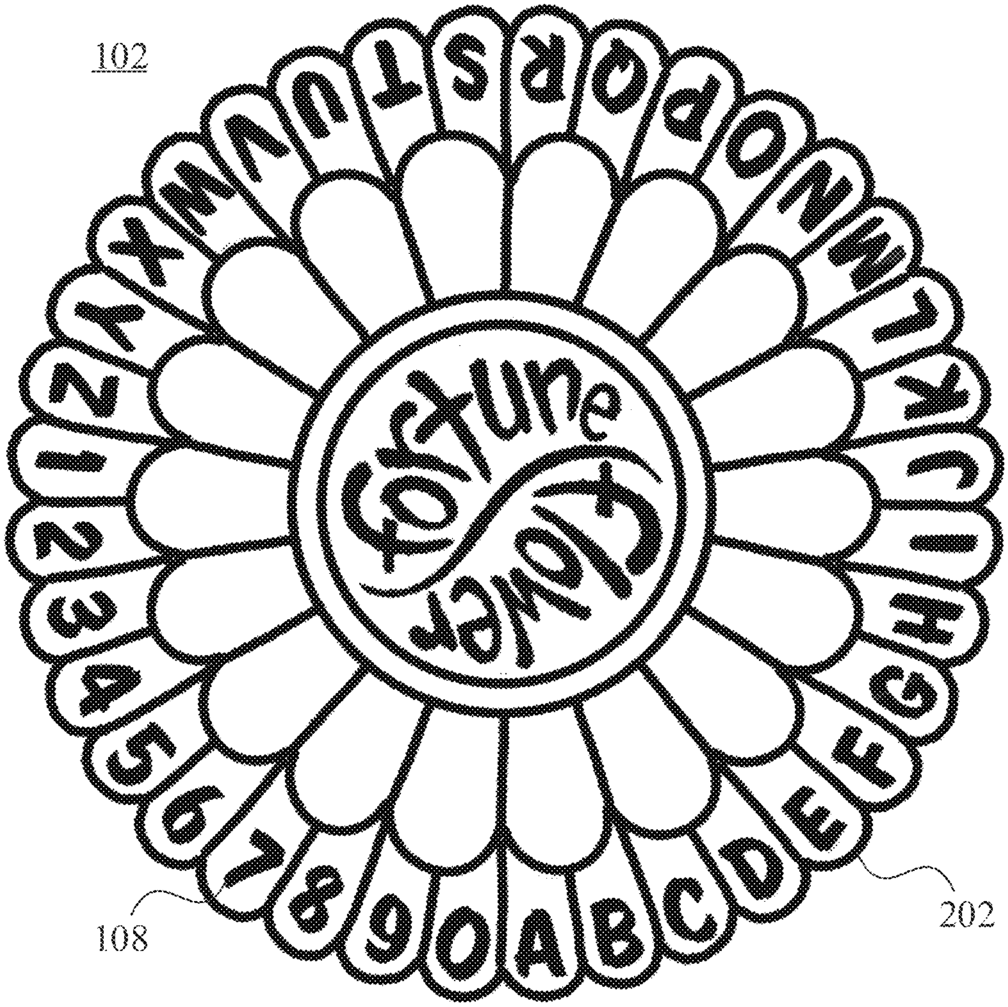
FIG. 2 is a top-down view of a rotatable disc that shows characters positioned around a perimeter of the disc, in accordance with an embodiment of the present invention.

Referring now to FIG. 2, a top-down view of the disc 102 is shown. The disc 102 may include sections 202, each having a respective alphanumeric character 108. While the sections 202 are shown as each having a single character 108, it should be understood that multiple characters may be arranged in a single physical section 202. In some embodiments the distinction between sections may be arranged in any decorative fashion or may be omitted altogether.

In the illustrated embodiment there are 36 sections, one for each letter of the alphabet and one for each Arabic numeral, but it should be understood that any appropriate number of sections may be used to correspond to larger or smaller character sets. In some embodiments, the disc 102 may principally be formed from an opaque material, with the characters 108 being formed from a translucent material that permits light from an underlying light source to shine through. In some embodiments, the characters may include iconographic symbols, such as emojis, and other non-alphanumeric symbols or shapes.

Each character 108 on the disc 102 has a respective angular position. For example, the position of the letter A may be defined as 0°. Each character will occupy a respective position that depends on the number of characters. Following the above example of 36 characters, each character 108 will differ in its angular position from the preceding and succeeding character by 360/36=10 degrees. Thus the letter A has a position of 0°, the letter B has a position of 10°, the letter C has a position of 20°, and so on up to the number 0 with a position of 350°.

It should be understood that the ten-degree spacing is a result of the thirty-six alphanumeric characters of the English alphabet and Arabic numerals, but this is only one possible arrangement. In some embodiments the spacing between characters 108 may be irregular. In some embodiments there may be more or fewer characters 108, resulting in a different spacing. The positions of the characters may therefore be stored in a memory, so that they may be located precisely for illumination.

Figure 3:
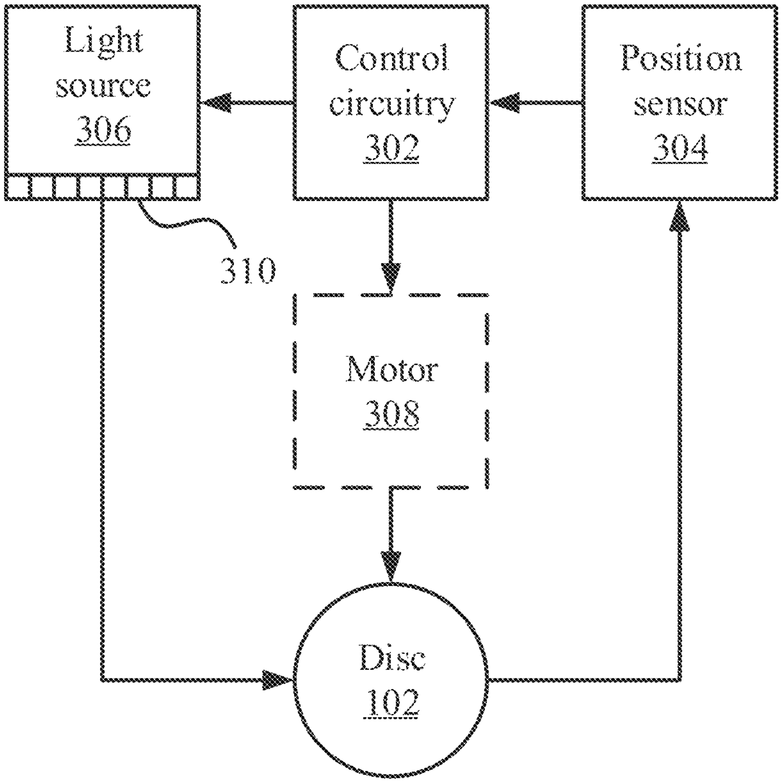
FIG. 3 is a block/flow diagram illustrating functional components of a toy with a rotatable disc that uses a light source to illuminate a message, in accordance with an embodiment of the present invention.

Referring now to FIG. 3, a block diagram illustrates the operation of the fortune telling toy. The disc 102 is shown in functional relation to control circuitry 302. The control circuitry measures the rotational phase of the disc 102 using position sensor 304. In some embodiments, the phase may be detected using an optical detector or photosensor and one or more visible marks on the disc 102, for example on the underside of the disc 102. As the one or more marks pass by the optical detector, the control circuitry 302 receives periodic signals that, in some embodiments, indicates the speed of the disc 102. In some embodiments, a single visible mark may be used, and the signal from the optical detector may thus be used to identify the orientation of the disc 102 at that time. By measuring the period of the signals, the rotational speed of the disc 102 may be inferred and its absolute phase at any time may be estimated. In some embodiments, an absolute phase encoder may be used to determine the rotational position of the disc 102 directly.

In some embodiments, the visible mark may include a portion of the disc 102 that has a different color, for example being black to absorb light so that the optical detector registers the change. In some embodiments, the visible mark may include a change in the surface of the disc 102, for example including a portion that protrudes past the edge of the disc or that has a different angle with respect to the surface of the disc 102 as compared to the surrounding material. In such embodiments, the visible mark may physically block a space between an emitter and the optical detector as it passes by.

In some embodiments, multiple visible marks may be used to provide additional resolution on the position of the disc 102. For example, a single relatively thick mark may establish an absolute angular position, and thinner marks may be used to identify the passage of the disc 102 through different angular positions relative to the thick mark, thereby smoothing the measurement of speed of rotation and stabilizing the appearance of the message. The mark(s) may have any position on the disc 102, as long as their positions relative to the characters 108 are fixed.

For example, the position sensor 304 may detect that the disc 102 is rotating every 0.05 seconds. The current phase of the disc 102 may be determined by measuring the amount of time that has elapsed since the mark was last detected, dividing that time by the period, 0.05 seconds, and multiplying by 360 degrees. While there may be some error that results from a change to the speed of the disc 102, the period may be updated as a running average across several rotations to stabilize small changes.

Based on the determined phase of the disc 102, the control circuitry 302 sends power to the light source 306 to illuminate one or more characters 108 as they pass over the appropriate position. The light source 306 may include, for example, a set of separately addressable light emitting diodes (LEDs) 310 in a line, or along an arc. The light source 306 may be fixed to the body 104 and may be positioned underneath an edge of the disc 102. The number of LEDs 310 in the light source 306 may correspond to a number of distinct character positions that may be illuminated and thus sets a limit for the length of the word that is displayed, but it should be understood that any appropriate number of LEDs may be used. In some embodiments, the light source 306 may include eight LEDs 310, such that words (or parts of words) of up to eight characters may be displayed, but it should be understood that any appropriate number of LEDs 310 may be used. In some embodiments, a maximum number of LEDs 310 may correspond to the number of different characters 108 on the disc 102.

In some embodiments, the LED 310 may emit a white color (e.g., by a combination of red, blue, and green light or by a layer of light-emitting phosphor). In some embodiments, the color output by the LEDs 310 may be controlled, for example selecting particular colors associated with holidays or for other symbolic purposes.

As described above, each character 108 on the disc 102 has a respective phase (i.e., position along the perimeter of the disc 102). The control circuitry 302 can determine when to illuminate a light source based on the angular position of a designated character and the phase of the disc 102. Consider for example the word "NO." The letter N may have a position of 130° and the letter O may have a position of 140°. If a first LED of the light source 306 is positioned at 0° and the second LED of the light source 306 is positioned at 10° when the disc 102 has a phase of 0°, then both the first and second LEDs 310 may be illuminated at the same time each time the disc returns to a phase of 0°. This occurs when the disc 102 has a phase of 250°.

In the example of the word "YES," the illumination of the light source 306 will be more complex. The letter Y may have a position of 240°, the letter E may have a position of 40°, and the letter S may have a position of 180°. Thus the first LED of the light source is illuminated when the disc 102 aligns the letter Y with the 0° position, which occurs when the disc 102 has a phase of 120°. The second LED of the light source is illuminated when the disc 102 aligns the letter E with the 10° position, which occurs when the disc 102 has a phase of 330°. The third LED of the light source is illuminated when the disc 102 aligns the letter S with the 20° position, which occurs when the disc 102 has a phase of 200°. In some embodiments, the order of illumination of the letters may be arranged such that they are displayed as closely to one another as possible in a single rotation, to minimize the appearance of flashing.

The formula for the phase of the disc 102 at which a given LED in the light source 306 is illuminated may be determined as:

$$\phi_{disc} = 360 - \phi_{char} + \phi_{LED}$$

where $\phi_{char}$ is the angular position of the character being illuminated and where $\phi_{LED}$ is the position of the LED being illuminated (e.g., determined by the position of the character within the word being displayed). Following the above example, $\phi_{LED}$ may be determined as $\phi_{LED}=10°\times y$, where y is the zero-indexed position of the character within the word.

In some embodiments, multiple characters may be visually superimposed by illuminating them using the same LED 310 at different times. This can be used in particular with characters 108 that include non-alphanumeric symbols and shapes, so that a symbol may be displayed which is not included as a discrete character on the disc 102.

In some embodiments, a motor 308 may be used to drive the rotation of the disc 102. The motor 308 may be controlled by control circuitry 302, which may explicitly set a rotational speed. In embodiments where the speed of the motor 308 is known with confidence, the set rotational speed may be used in conjunction with the signal from the position sensor 304, obviating the calculation of the disc's average speed. However, consumer-grade motors may not offer a high degree of certainty as to their speed, and so optical determination of the disc's position may still be needed.

The control circuitry 302, the position sensor 304, and the light source 306 may be powered by operation of the handle 106, for example using a dynamo to convert the rotational motion of the handle 106 into electrical current. A high-capacity capacitor may be used to smooth power delivery from the dynamo to ensure consistent operation. In some embodiments, a battery may be used to power these components and the motor 308, if used, instead.

This method displays a single static word, but other effects are contemplated as well. For example, text may be made to scroll as in a marquee by shifting the letters of the response message with respect to which LEDs 310 display them. In some embodiments an individual character may appear to move relative to the others by changing which LED 310 illuminates that character. An additional visual effect may include initially displaying the letters of a message out-of-order and then rearranging them into a correct order.

Figure 4:
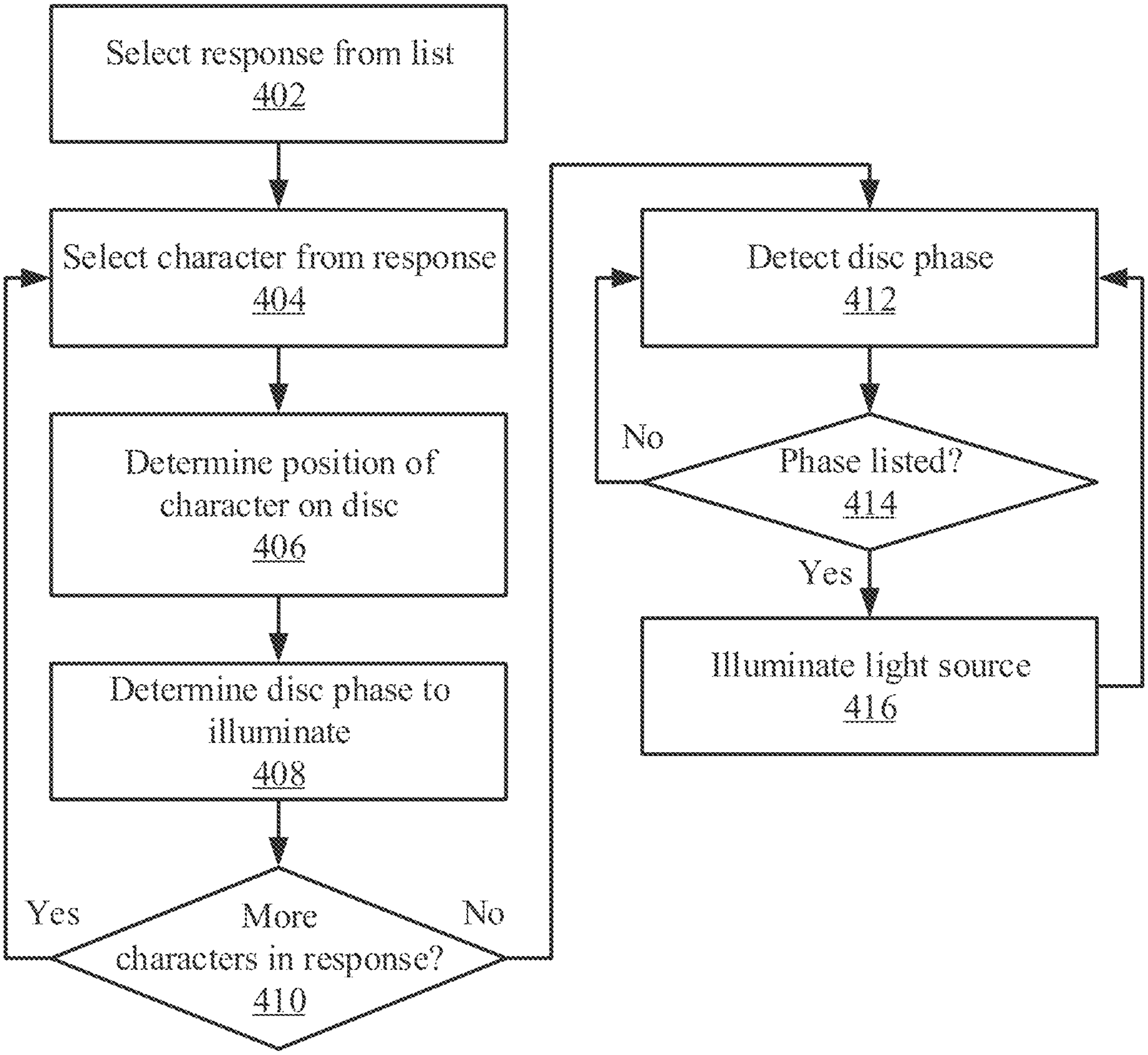
FIG. 4 is a block/flow diagram of a method for displaying a message by illuminating characters on a rotating disc, in accordance with an embodiment of the present invention.

Referring now to FIG. 4, a method for displaying a response message using the fortune telling toy is shown. Block 402 selects a response from a list of predetermined messages. In some embodiments, the response may be a single word with a number of characters equal to or fewer than a number of LEDs 310 in the light source 306. In some embodiments, a single response may include multiple words or parts of words, in which case the method of FIG. 4 displays a single word of the response and may be repeated after a delay for subsequent words.

Block 404 selects a first character from the response and block 406 determines the position of that character on the disc 102, for example measured in degrees from a starting position (e.g., starting from 0° at the letter A). Block 408 then determines the phase of the disc 102 at which to illuminate a corresponding LED of the light source 306, taking into account the position of the character within the response. This determined disc phase is added to a list and stored. If block 410 determines that there are further characters in the response, then processing returns to block 404 and a next character from the response is selected. In some embodiments, the order of the characters may be rearranged to match the order in which they appear on the disc, so that each is guaranteed to be displayed once per revolution.

If disc phases have been determined for all of the characters in the response, block 412 starts a display loop by detecting a current phase of the disc 102. If block 414 determines that the detected phase is stored in the list (e.g., having an equal phase to a stored disc phase or being within a threshold distance of the stored disc phase), block 416 illuminates the corresponding LED or LEDs 310 of the light source 306. In some cases multiple LEDs 310 may be illuminated at a single phase of the disc 102, if their positions line up with the corresponding characters on the disc 102 at the same time. Processing then returns to block 412 to detect an updated disc phase. This process repeats until a predetermined amount of time has elapsed or the disc 102 stops spinning. In embodiments where the response has multiple words or parts of words, processing may return to block 402 after the predetermined time has elapsed to select a next word of the response.

Figure 5:
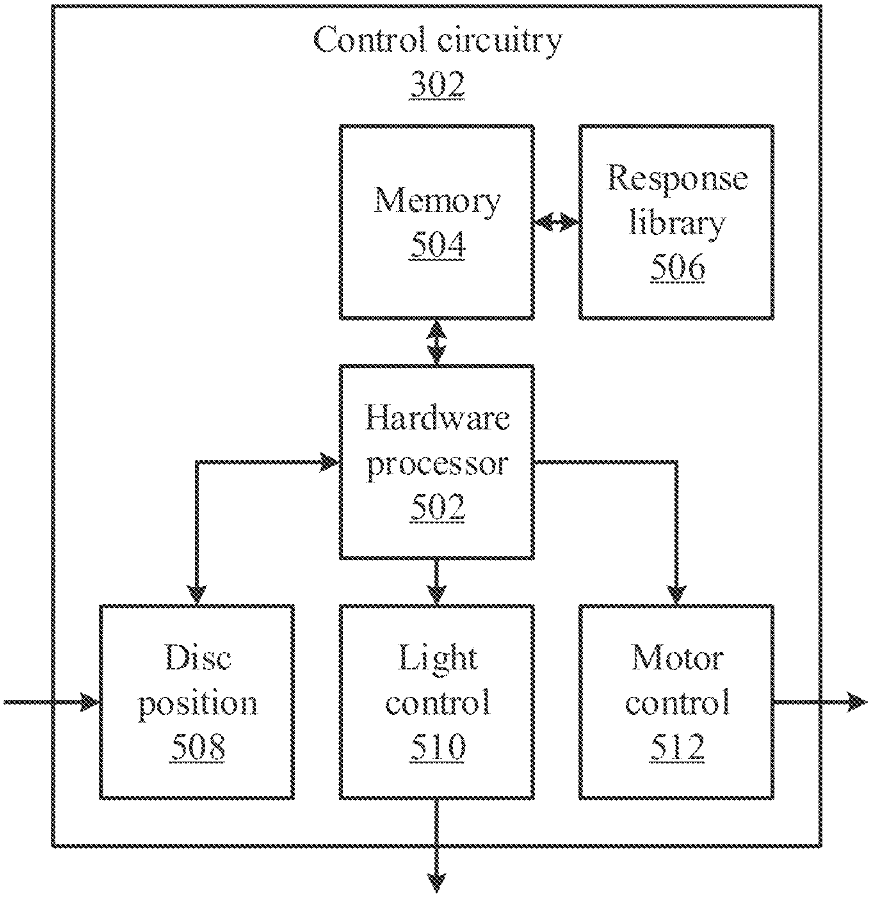
FIG. 5 is a block diagram of control circuitry for a toy that displays a message by illuminating characters on a rotating disc, in accordance with an embodiment of the present invention.

Referring now to FIG. 5, additional detail on the control circuitry 302 is shown. The control circuitry 302 includes a hardware processor 502 and a memory 504. The memory 504 may store a response library 506 that includes a list of responses that may be displayed on the fortune telling toy. The memory 504 may further include program instructions to implement various other functions as described herein.

In some embodiments, one or more of the illustrative components may be incorporated in, or otherwise form a portion of, another component. For example, the memory 504, or portions thereof, may be incorporated in the hardware processor 502 in some embodiments. Thus, although these components are shown as separate logical blocks, it should be understood that these and other functions may be implemented in a single package that includes processing, memory, and input-output pins.

The control circuitry 302 determines a disc position 508 using a signal from the position sensor 304. In some embodiments the hardware processor 502 calculates the disc position 508 from the signal using a timer and a determination of the speed of the disc 102. Based on the disc position 508, the hardware processor triggers light control 510 to control light source 306 as described above. In some embodiments the light control 510 may include a set of individual wires to respective LEDs 310 in the light source 306. In other embodiments the light control 510 may send a control signal via a communications bus, individual wires to a current amplifier or latching driver, or other appropriate intra-device communications medium.

In embodiments which use a motor 308 to control the rotation of the disc 102, the hardware processor 502 may trigger a motor control 512 to, for example, apply an appropriate control signal to the motor 308. In some embodiments the hardware processor 502 may further use the motor control 512 to control the speed of the motor 308.

The response library 506 may store the list of responses using any appropriate data format. In some embodiments, two bytes may be used to store each character, including six bits to identify the character and nine bits to encode a circumferential position in degrees. Messages of varying lengths can be displayed in parts (e.g., word by word) or can be scrolled. The response library 506 may further indicate a probability of selecting each respective response from the list, so that some responses may be displayed more frequently and others may be made more rare.

The processor 502 may be embodied as any type of processor capable of performing the functions described herein. The processor 502 may be embodied as a single processor, multiple processors, a Central Processing Unit(s) (CPU(s)), a Graphics Processing Unit(s) (GPU(s)), a single or multi-core processor(s), a digital signal processor(s), a microcontroller(s), or other processor(s) or processing/controlling circuit(s).

The memory 504 may be embodied as any type of volatile or non-volatile memory or data storage capable of performing the functions described herein. In operation, the memory 504 may store various data and software used during operation of the control circuitry 302. The memory 504 is communicatively coupled to the hardware processor 502 to facilitate input/output operations with the hardware processor 502, the memory 504, and other components of the control circuitry 302. The memory 504 may be embodied as any type of device or devices configured for short-term or long-term storage of data such as, for example, memory devices and circuits, memory cards, hard disk drives, solid state drives, or other data storage devices.

The control circuitry 302 may also include other elements (not shown), as readily contemplated by one of skill in the art, as well as omit certain elements. For example, various other sensors, input devices, and/or output devices can be included in control circuitry 302, depending upon the particular implementation of the same, as readily understood by one of ordinary skill in the art. Moreover, additional processors, controllers, memories, and so forth, in various configurations can also be utilized.

As employed herein, the term "hardware processor subsystem" or "hardware processor" can refer to a processor, memory (including RAM, cache(s), and so forth), software (including memory management software) or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), FPGAs, and/or PLAs.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a fortune flower (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A device, comprising:
a body;
a disc, rotatably attached to the body, that includes a plurality of characters arranged around the disc;
a light source, attached to the body, that illuminates selected characters of the plurality of characters; and
control circuitry configured to trigger the light source to illuminate the selected characters to display a message as the disc rotates, wherein the light source includes a plurality of light emitting diodes (LEDs) and the control circuitry triggers individual LEDs of the plurality of LEDs according to a position of a corresponding character within the message.

2. The device of claim 1, further comprising a handle, rotatably attached to the body, connected to the disc to cause the disc to rotate.

3. The device of claim 1, wherein the control circuitry is further configured to trigger a single LED of the plurality of light emitting diodes at different angular positions of the disc to visually superimpose multiple characters.

4. The device of claim 1, further comprising a position sensor that determines an angular position of the disc, wherein the control circuitry is further configured to trigger the light source according to the determined angular position of the disc.

5. The device of claim 4, wherein the position sensor includes a photosensor that detects a mark on the disc and wherein the control circuitry is further configured to determine the angular position of the disc based on a rotational speed of the disc and a time elapsed since the photosensor detected the mark.

6. The device of claim 5, wherein the control circuitry is further configured to determine rotational speed of the disc based on a period at which the mark is detected.

7. The device of claim 1, further comprising a motor connected to the body that causes the disc to rotate.

8. The device of claim 1, wherein the disc includes a translucent material and wherein the plurality of characters are opaque.

9. A device, comprising:

a body;

a disc, rotatably attached to the body, that includes a plurality of characters arranged around the disc;

a plurality of light emitting diodes (LEDs), attached to the body, that illuminate selected characters of the plurality of characters;

a position sensor that determines an angular position of the disc; and control circuitry configured to trigger individual LEDs of the plurality of LEDs according to the determined angular position of the disc and a position of a corresponding character within a message to illuminate the selected characters to display the message as the disc rotates.

10. The device of claim 9, further comprising a handle, rotatably attached to the body, connected to the disc to cause the disc to rotate.

11. The device of claim 9, wherein the control circuitry is further configured to trigger a single LED of the plurality of light emitting diodes at different angular positions of the disc to visually superimpose multiple characters.

12. The device of claim 9, wherein the position sensor includes a photosensor that detects a mark on the disc and wherein the control circuitry is further configured to determine the angular position of the disc based on a rotational speed of the disc and a time elapsed since the photosensor detected the mark.

13. The device of claim 12, wherein the control circuitry is further configured to determine rotational speed of the disc based on a period at which the mark is detected.

14. The device of claim 9, further comprising a motor connected to the body that causes the disc to rotate.

15. The device of claim 9, wherein the disc includes a translucent material and wherein the plurality of characters are opaque.

16. A device, comprising:

a body;

a translucent disc, rotatably attached to the body, that includes a plurality of opaque characters arranged around the disc;

a handle that is rotatably attached to the body and that is connected to the disc to cause the disc to rotate;

a plurality of light emitting diodes (LEDs), attached to the body, that illuminate selected characters of the plurality of characters;

a photosensor that determines an angular position of the disc by detecting a mark on the disc; and control circuitry configured to trigger individual LEDs of the plurality of LEDs according to the determined angular position of the disc and a position of a corresponding character within a message to illuminate the selected characters to display the message as the disc rotates.

17. The device of claim 16, wherein the control circuitry is further configured to trigger a single LED of the plurality of light emitting diodes at different angular positions of the disc to visually superimpose multiple characters.

18. The device of claim 16, wherein the control circuitry is further configured to determine the angular position of the disc based on a rotational speed of the disc and a time elapsed since the photosensor detected the mark.

19. A device, comprising:

a body;

a disc, rotatably attached to the body, that includes a plurality of characters arranged around the disc;

a light source, attached to the body, that illuminates selected characters of the plurality of characters;

control circuitry configured to trigger the light source to illuminate the selected characters to display a message as the disc rotates; and a handle, rotatably attached to the body, connected to the disc to cause the disc to rotate.

* * * * *